(12) United States Patent
Aberle

(10) Patent No.: US 10,110,719 B2
(45) Date of Patent: Oct. 23, 2018

(54) MAGNIFICATION AND LIGHTING ATTACHMENT FOR MOBILE TELEPHONES

(71) Applicant: Brian Joseph Aberle, Newton, NC (US)

(72) Inventor: Brian Joseph Aberle, Newton, NC (US)

( * ) Notice: Subject to any disclaimer, the term of this patent is extended or adjusted under 35 U.S.C. 154(b) by 0 days.

(21) Appl. No.: 15/732,665

(22) Filed: Dec. 11, 2017

(65) Prior Publication Data

US 2018/0176349 A1    Jun. 21, 2018

Related U.S. Application Data

(60) Provisional application No. 62/497,999, filed on Dec. 12, 2016.

(51) Int. Cl.
*H04N 5/225* (2006.01)
*H04M 1/02* (2006.01)
(Continued)

(52) U.S. Cl.
CPC ........ *H04M 1/0264* (2013.01); *G02B 13/001* (2013.01); *H04M 1/22* (2013.01); *H04N 5/2252* (2013.01)

(58) Field of Classification Search
None
See application file for complete search history.

(56) References Cited

U.S. PATENT DOCUMENTS

2013/0002939 A1* 1/2013 O'Neill ............ G02B 7/14
                                                       348/360
2015/0293430 A1* 10/2015 O'Neill ............ G03B 17/565
                                                       396/544
(Continued)

*Primary Examiner* — David Bilodeau
(74) *Attorney, Agent, or Firm* — Withrow & Terranova, PLLC

(57) ABSTRACT

An assembly for use on a piece of equipment comprising a mobile phone with a camera function, the phone having a light which is integral to the body of the equipment, the phone further including a camera lens capable of taking a photograph of an object, and a phone cover removably attached to the mobile phone. The assembly has a carrier assembly, the carrier assembly has a support and a base, and a carrier member attached to the support, the carrier member being movably and releasably mounted to the support, and the carrier member is movable relative to the base and the phone cover. The carrier member includes at least one lens station mounted on it, the lens station includes at least one lens separate from but aligned with the lens in the body of the mobile phone. The lens at the lens station is located between the camera lens of the mobile phone and the object to be photographed and the lens of the lens station is adapted to magnify the image of the object. The carrier member further includes a light source mounted thereto. The light source is adapted to illuminate at least a portion of the object to be photographed. The light source being mounted to the carrier member such that the light source is movable relative to the base and the phone cover, and the light source is separate from but operatively associated with the light in the body of the phone so that light from the light in the body of the phone is coupled to the light source on the carrier member and the light exits the light source and is projected toward the object to be photographed.

16 Claims, 3 Drawing Sheets

(51) Int. Cl.
*H04M 1/22* (2006.01)
*G02B 13/00* (2006.01)

(56) References Cited

U.S. PATENT DOCUMENTS

2017/0126943 A1* 5/2017 Fletcher ............... H04N 5/2254
2018/0054565 A1* 2/2018 Smith ................ H04N 5/23222
2018/0107093 A1* 4/2018 Chalenko ............. G03B 11/045

* cited by examiner

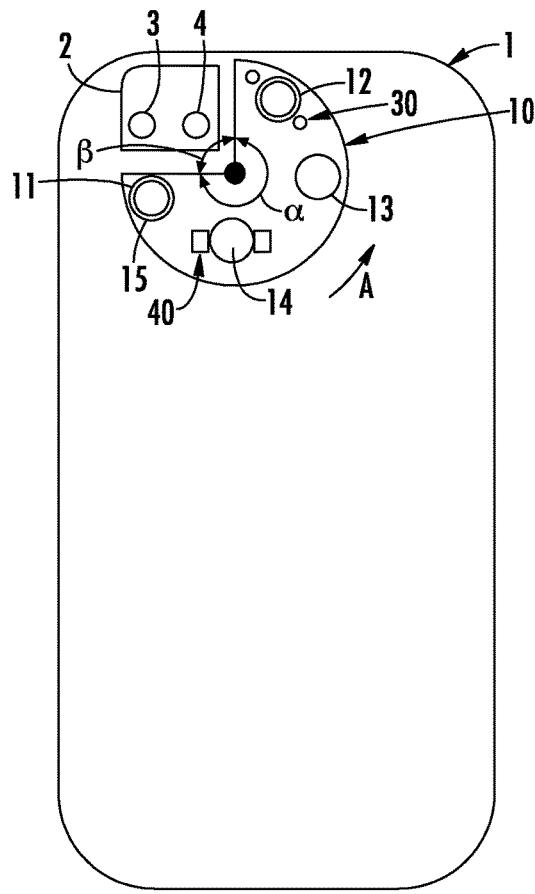
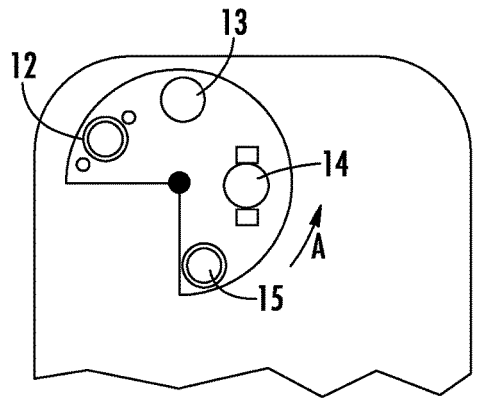
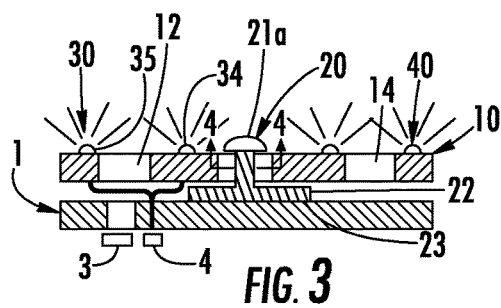
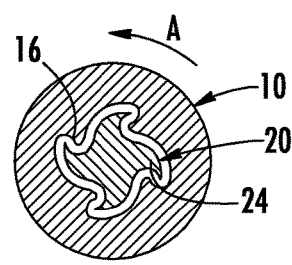
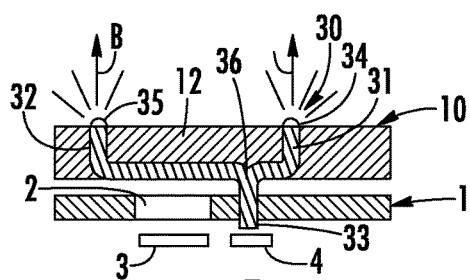
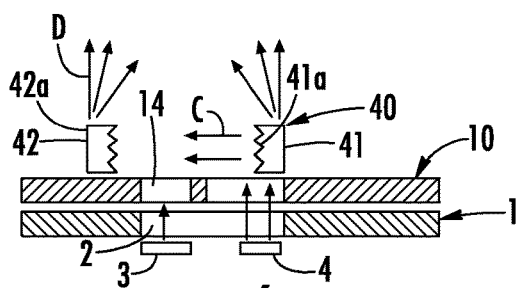

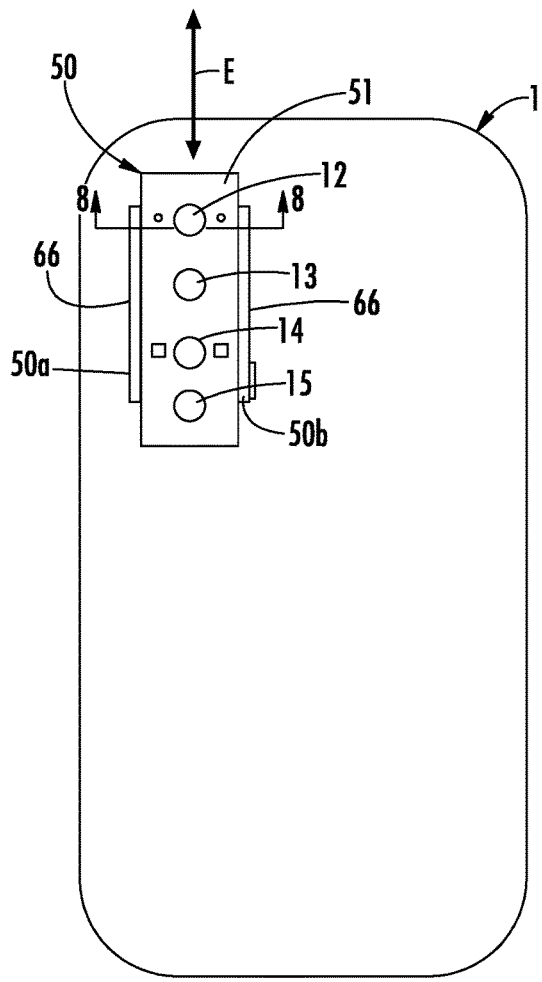
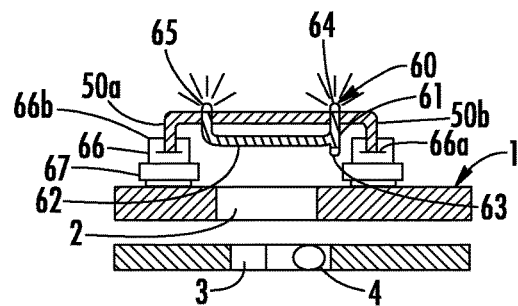
FIG. 8
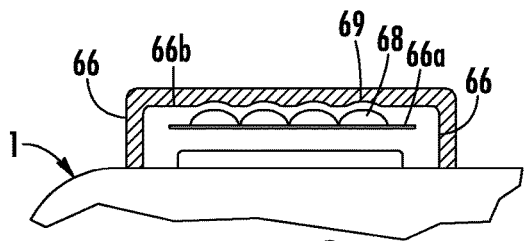
FIG. 9
FIG. 7
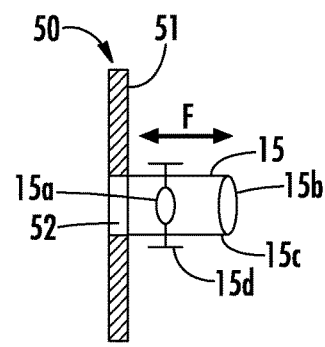
FIG. 10

MAGNIFICATION AND LIGHTING ATTACHMENT FOR MOBILE TELEPHONES

This disclosure claims priority to U.S. Provisional Patent Application Appl. No. 62/497,999 filed Dec. 12, 2016.

The disclosure relates to magnification and lighting devices that are useful as an attachment to equipment such as electronic equipment having a digital camera function and light such as for example a cell phone, tablet, or other electronic device.

BACKGROUND OF THE INVENTION

Mobile telephone devices may include a camera with a lens and a light integrated in the body of the devices. In order to obtain quality images, the object that is the subject of a picture taken by the camera should be appropriately magnified and illuminated. Magnification can be accomplished by the use of a hand-held magnifying glass, but this is not attached to the mobile device and is cumbersome to use. Similarly a light such as a hand-held flashlight can be used to further illuminate the subject of a picture but this can be cumbersome as well.

SUMMARY OF THE INVENTION

One aspect of the disclosure is an assembly for use on a piece of equipment comprising a mobile phone with a camera function, the phone having a light which is integral to the body of the equipment, the phone further including a camera lens capable of taking a photograph of an object, and a phone cover removably attached to the mobile phone. More specifically, the assembly has a carrier assembly that can be attached to the phone. The carrier assembly includes a magnifying lens station and a light source additional to, and for operation with, the light and the lens already existing inside the mobile phone. The carrier assembly has a support and a base, and a carrier member attached to the support, the carrier member preferably being movably and releasably mounted to the support, and the carrier member is movable relative to the base and the phone cover. The carrier member includes at least one lens station mounted on it, the lens station includes at least one lens separate from but alignable with the lens in the body of the mobile phone. The lens at the lens station is located between the camera lens of the mobile phone and the object to be photographed and the lens of the lens station is adapted to magnify the image of the object and project that magnified image to the lens in the body of the phone. The carrier member further includes a light source mounted thereto. The light source is adapted to illuminate at least a portion of the object to be photographed. The light source being mounted to the carrier member such that the light source is movable relative to the base and the phone cover, and the light source is separate from but operatively associated with the light in the body of the phone so that light emanating from the light in the body of the phone is coupled into the light source on the carrier member, and the light exits the light source and is projected toward the object to be photographed.

In another aspect of the disclosure, the light source has a first optical path or trace made of a transparent material such as glass optical fiber, for example. The first optical path or trace having an optical collector at one end for collecting light from the light which is integral to the phone. The optical collector couples the light into the transparent material, and the first optical path includes least one light emitter optically coupled to another end of the first optical path and projecting light for illuminating the object to be photographed with light transmitted from the collector to the emitter. The optical collector is to be optically aligned with the light which is integral to the phone so the light emanating therefrom light is transmitted into the collector and through the first optical path to the emitter and form there toward the object to be photographed. More specifically, from the emitter the light is projected toward the object to be photographed when the image of the object is being magnified by the lens.

In yet another aspect of the disclosure, the light source includes an optical splitter, the optical splitter being optically attached to the first optical path, and the optical splitter being optically attached to a second optical path having a second emitter. The optical splitter can be, for example, a Y-branch formed in the optical trace and can be formed of glass or transparent plastic material. The optical splitter permits light to be transmitted to, for example, both of the first and second optical paths and the first and second emitters, respectively. The splitter can have more than two branches, however. The emitters are glass or transparent materials with that project light out of the optical path or trace, and can have a convex or concave shape for dispersing or focusing the light.

The carrier member and support can have a ratchet and pawl construction so that movement of the carrier member results in the carrier member being releasably fixed in place according to the desired disposition of the carrier member relative to the support. Since the carrier member has multiple lens stations, moving the carrier member will align the lens and light of the phone with the desired lens and light source of the lens stations. This allows for various degrees of magnification and selection of lighting schemes for the photographs. In other words, a desired position is aligning a lens station and optical collector with the lens and light in the body of the phone. In such a desired position the opening (described below) formed in the carrier member would not be in an aligned position with respect to the lens and light of the phone. Moreover, the support can be attached to a surface of the cover of the phone by adhesive or Velcro, for example, or the support can be monolithically formed with the cover. Alternatively, the support can have flexible extensions in the form of at least one gripper that is adapted to grip the sides of the cover of the mobile phone. The support can include a structure allowing separation of the carrier member from the support. Such a structure can be a holding member operatively attached to the support and releasably holding the carrier member in place on the support, or a snap-fit structure can be used allowing the carrier member to be snap-fit onto the support and permitting separation of the carrier member from the support. Several carrier members can be made all with various configurations of lens stations, lens magnifications, and light sources, and the operator can replace a carrier member with a different carrier member having the alternative configurations. The carrier member is preferably a flat, disc shaped structure but it can be other shapes as well.

In yet another aspect of the disclosure, and as mentioned above, the carrier member has an opening formed in it. The opening can extend in an angle of, for example, about 90 degrees. The opening can be aligned with the light and lens of the mobile phone, or one of the lens stations and light sources can be aligned with the light and lens of the mobile phone. The carrier member can have two lens stations positioned on the carrier member adjacent to the opening that can be aligned with the lens and light of the phone. Each of the lens stations has at least one respective light source for alignment with the light of the phone capturing light into the light paths or optical traces and thus providing illumination to the object to be photographed. At least one of the light sources can include one or more optical splitters. An optical splitter is optically attached to two optical paths or traces having respective optical emitters at their ends. Each emitter can project light toward an object to be photographed as the lens in the lens station is magnifying the image, thus appropriately magnifying and illuminating the object. The lens in the body of the phone sees the magnified image of the object that is illuminated by the light source on the carrier member. It is such a magnified and illuminated image that the camera function of the phone will observe so that a high quality digital photo of the magnified and illuminated image can be made by the camera.

In another aspect of the disclosure, the support can be in the form of a rail that receives a portion of the carrier member, the carrier member being linearly movable relative to the support. Such a linearly movable carrier member can have one or more light sources and lens stations. The linearly movable carrier member and rail can include a ridge and recess structure that holds the carrier member in place relative to the support rail, and they can be replaced with other carrier members as alternates are required.

The light sources can be include, for example, a light diffuser. The light diffuser can have ridges on the light output side for diffusing light and projecting the light generally parallel to a major surface of the mobile phone, and also projecting light generally perpendicular to the major surface. The light sources can include glass or plastic optical fiber, or a combination thereof, as optical traces and optical light paths.

BRIEF DESCRIPTION OF THE DRAWINGS

FIG. 1 is a front view of a magnification and lighting device of the disclosure.

FIG. 2 is a partial front view of the magnification and lighting device.

FIG. 3 is a cross section of a carrier of the magnification and lighting device and carrier assembly.

FIG. 4 is a cross section of a support of the carrier.

FIG. 5 is a cross section of a first light source of the magnification and lighting device.

FIG. 6 is a cross section of a second light source of the magnification and lighting device.

FIG. 7 is a front view of a second magnification device.

FIG. 8 is a cross section of a carrier of the second magnification device.

FIG. 9 is another cross section of the carrier of the second magnification device.

FIG. 10 is a cross section of an example lens assembly.

DETAILED DESCRIPTION OF THE DISCLOSURE

Figure 11:
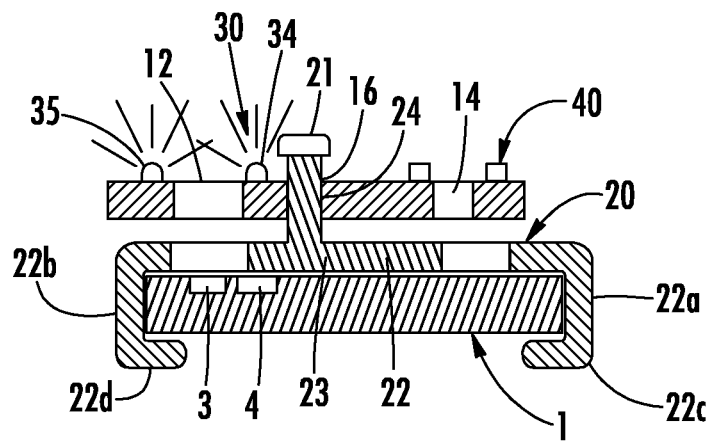
FIG. 11 is a cross section of a carrier of the magnification device and another embodiment of the carrier assembly.

FIG. 1 shows a piece of equipment having a magnification device associated with it. The equipment has a cover 1 with an aperture 2, a lens 3, and a light 4 in the body of the equipment. The equipment can be, for example, a mobile device such as a cell phone or IPAD manufactured by Apple or Samsung, a smartphone such as the Apple iPhone 7, iPhone 7 Plus, a Samsung Galaxy Grand Prime Plus, iPhone 6s or Galaxy S8, or the like which includes a digital camera function associated with the lens and the light in the body of the equipment so that the equipment is capable taking digital photographs.

A magnification and lighting device is attached to cover 1. The magnification and lighting device includes a carrier assembly having a carrier member 10 which is, for example, a generally round and essentially flat piece having a major surface that extends around about 270 degrees (angle alpha). Carrier member 10 includes an opening or open area 11, which extends about 90 degrees (angle beta), and optical assemblies 12,13,14,15 mounted on carrier member 10. The optical assemblies include at least one optical component such as a lens for magnification of light that is to be projected through the lens and into the lens in the body of the equipment. In addition, one or more of the optical assemblies can include light sources 30,40 respectively adjacent thereto for collecting light form the light in the body of the equipment projecting light toward the object(s) to be photographed. Carrier member 10 is rotatably mounted to cover 1 so that rotation in direction A moves the optical assemblies into alignment with the lens 3 and light 4. FIG. 1 depicts open area 11 aligned with the lens 3 and light 4 which renders carrier member 10 clear of lens 3 and light 4, and FIG. 2 depicts carrier member 10 rotated into a position in the direction of arrow A where optical assembly 12 is aligned with lens 3 and light 4. Alternatively, open area 11 can be fully or partially occupied by a carrier piece (not shown) that can be opaque, clear, colored, filtered, and/or comprise a convex or concave lens and formed of a material such as glass or plastic. Carrier member 10 can be shapes other than the generally round 270 degree form as shown, for example, it can be triangular, octagonal, crescent, oval, or another suitable shape and all such shapes can include an open area or a carrier piece as previously described.

FIG. 2 more fully describes the magnification and lighting device. Carrier member 10 is rotatably mounted to cover 1 via a support 21. As shown by the cross section of support 21 (FIG. 4), support 21 is operatively associated with carrier member 10 such that carrier member 10 can be rotated and releasably locked in positions such that open area 11 and optical assemblies 12,13,14,15 can be rotated into alignment with lens 3 and light 4 in the body of the equipment. For example, support 21 and carrier member 10 can be formed with flexible members that releasably lock the carrier member's position relative to cover 1. In one example, the flexible members may be in the form of a ratchet and pawl construction 16,24 whereby rotation of carrier member 10 along direction A will result in the carrier member being releasably fixed in place according to the desired disposition of carrier member 10 relative to the lens 3 and light 4 in the body of the equipment. Alternatively, the rotational position of carrier member 10 can be held by one or more flexible detents, ridges, springs, pins, screws, magnets, or other components formed on the support 21 and carrier member 10. In addition, support 21 can include a structure allowing separation of carrier member 10 from support 21. For example, support 21 can be at least partially threaded at the upper portion thereof and a holding member, such as for example a nut 21*a*, is operatively attached to the support, such as by screwing the nut to the upper portion and thereby releasably holding the carrier member in place. As an alternative to a thread/nut arrangement, a snap-fit structure can be formed on carrier member 10 and support 21. In this way, the operator can remove carrier member 10 and replace it with other carrier members as desired. The other carrier members are interchangeable with carrier member 10 and can have different lenses, filters, light source arrangements, splitters, optical fibers, diffusers or other optical and/or photographic components mounted thereon.

Figure 12:
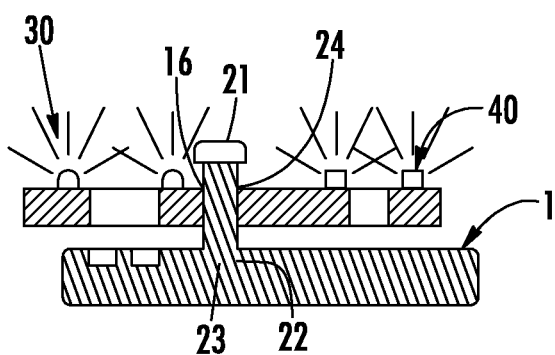
FIG. 12 is a cross section of a carrier of the magnification device and yet another embodiment of the carrier assembly.

Referring to FIG. 3, support 20 includes a base 22 and attachment area 23. Base 22 provides firm mechanical support for carrier 10. Attachment area 23 attaches the magnification and lighting device to the cover with, for example, an adhesive, or Velcro material such as a micro Velcro material. Optical assembly 12 is aligned with lens 3 and light 4, and optical assembly 14 is in a non-aligned position relative to lens 3 and light 4 of the equipment. Optical assemblies 12 and 14 each include a respective light source 30,40. In addition to or in lieu of the adhesive and/or Velcro, attachment area 23 and base 22 can be extended to include one or more grippers that extend to the edge or edges of the device cover 1. The grippers can be in the form of one or more flexible extensions 22a,22b (FIG. 11) which are flexible and can be bent and extended partially or all the way around the cover during installation onto cover 1. For example, the grippers can have one or more frictional areas 22c,22d that can grip the short sides of the cover or can extend around to engage the longer side of the cover. Alternatively, support 21, base 22, and attachment area 23 can be formed monolithically with cover 1 (FIG. 12).

FIG. 5 provides a further illustration of optical assembly 12 and light source 30. Light source 30 includes one or more optical traces such as optical fiber, for example, a light transmitting plastic or glass optical fiber or a combination hereof, which can be clear or colored/filtered, that are embedded in, or attached on the outside of, carrier member 10. In addition, light source 30 includes optical traces 31,31, each having a light emitter 34,35 respectively associated therewith. Light collector 33 is aligned with light 4 in a way that maximizes the amount of light being collected or coupled into the optical traces. In an exemplary operation, light 4 emits light which is collected by collector 33 and which passes through a splitter 36. The light is directed into paths 31,32 and is emitted by light emitters 34,35. The light is directed in direction B toward object(s) to be photographed by the equipment.

FIG. 6 further illustrates optical assembly 14. Optical assembly 40 includes light source 40, which employs optical components, alone or in combination, that includes a light transmission path that results in diffused or focused light. For example, two optical diffusers 41,42 can be mounted to carrier member 10 such as by adhesive bonding. Optical ridges 41a,42a are respectively formed on at least one respective surface of optical diffusers 41,42. Light enters the diffuser 41 which diffuses light from a lower side surface of the diffuser 41 in a first optical path, and the light moves to optical ridges 41a. The light is emitted from optical ridges 41a toward diffuser 42, it enters optical diffuser 42 and is further diffused by diffuser 42. Optical ridges or edges 41a,42a are operative to diffuse light in the first optical path which ultimately projects from the diffusers. In an exemplary operation, light is emitted by light 4 in the body of the equipment toward diffuser 41, which in turn transmits light toward the object(s) to be photographed and at the same time projects light to diffuser 42 along direction C parallel to the major surface of the equipment. Diffuser 42 collects and reflects the light and projects or transmits it toward the object(s) to be photographed along direction D which is generally perpendicular to the major surface of the equipment. Alternatively, lenses can be formed instead of optical ridges whereby the len(s) will focus light on the object(s) to be photographed as opposed to diffusing the light. However, combinations of diffusers and lenses, and other components such as for example, splitters, filters, optical traces, and optical fibers can be used.

Alternative optical assemblies can include, in addition to a lens or as a substitute, other optical components such as optical filters and attenuators. In addition, the optical assemblies can include more than one lens such as an exemplary optical assembly 15 including a telescopic configuration, and example of which is shown in FIG. 10. Optical assembly 15 includes two lenses 15a, 15b supported by a housing 15c. The distance between the lenses can be adjusted along direction F by use of adjustment 15d which can be a sliding mechanism, a rack and pinion, screw adjustment or the like. Optical assembly 15 can be mounted to carrier 50, although it could be part of carrier 10 as well.

FIGS. 7-9 describes a second embodiment of the magnification and lighting device. FIG. 7 depicts a carrier member 50, which is moved by linear action along direction E. Carrier member 50 includes a support 51 and support sections 50a,50b. Optical assemblies 12,13,14,15 as described above with reference to FIGS. 1-6 can be mounted on or in carrier member 50, in addition to variations thereof, and carrier member 50 can be slidably adjusted to be clear of lens 3 and light 4 in the body of the equipment as well. For example, the cross section of FIG. 8 depicts an optical assembly 60 mounted to carrier member 50 having optical traces and a splitter 61, optical paths 62, a light collector 63, and light emitters 64,65. Optical assembly 60 further includes housings 66 attached to cover 1 for example by an adhesive or Velcro such as micro Velcro located at attachment areas 67. Rails 66a,66b are slidably received within housings 66 and a detent system is provided to releasably lock carrier member 50 in place as it is adjusted. The detent system, as shown in FIG. 8, can include, for example, ridges 68 formed on rails 66a,66b and corresponding recesses formed on the inside surfaces of housings 66. An operator can linearly move or slide carrier member 50 along direction E to position one of optical assemblies 12,13,14,15 in place and the detent system will releasably hold the carrier member in place.

The present disclosure describes and claims an exemplary magnification and lighting attachment for mobile devices such as smartphones. The disclosure is not intended to be limiting, and the claims are intended to cover alternative structures relative to those shown and described herein.

The invention claimed is:
1. A camera attachment for a mobile phone with a camera lens and an illumination component to photograph an object, comprising:
 a support configured to be nonmovably attached to the mobile phone;
 a carrier member movably mounted to the support, the carrier member configured to be movable relative to the mobile phone;
 a first lens station mounted to the carrier member, the first lens station comprising a lens; and
 a light component mounted to the carrier member;
 wherein the carrier member is configured to move between a first position and a second position with the support nonmovably attached to the mobile phone;
 wherein, in the first position, the first lens station is in alignment and optically coupled with the lens of the mobile phone to optically magnify the object to be photographed by the mobile phone, and the light component is in alignment and optically coupled with the illumination component of the mobile phone to illuminate the object to be photographed by the mobile phone, wherein, in the second position, the first lens station is out of alignment and not optically coupled with the lens of the mobile phone, and the light component is out of alignment and not optically coupled with the illumination component of the mobile phone;

wherein the carrier member further comprises a semi-annular opening of about 90 degrees and the first lens station and a second lens station are positioned adjacent the semi-annular opening, the semi-annular opening configured to be aligned with the illumination component and the lens of the mobile phone.

2. The camera attachment of claim 1, wherein the light component further comprises a transparent material forming a first optical path, the light component comprising an optical collector at one end for collecting light from the illumination component of the mobile phone and coupling the light into the light component, and comprising a first light emitter optically coupled to another end for illuminating the object to be photographed with the light propagated from the optical collector to the first light emitter through the first optical path.

3. The camera attachment of claim 2, wherein the light component further comprises a second light emitter and an optical splitter forming a second optical path between the optical collector and the second light emitter, the optical splitter configured to propagate the light from the optical collector to both of the first and second light emitters along the first and second optical paths, respectively.

4. The camera attachment of claim 1, wherein one of the carrier member and the support further comprises a ratchet and wherein another of the carrier member and the support further comprises a pawl.

5. The camera attachment of claim 4, wherein the support is attached to a surface of a cover of the mobile phone.

6. The camera attachment of claim 1, wherein the light component comprises an optical splitter, the optical splitter being optically coupled to at least two optical paths comprising respective optical emitters for projecting light from the illumination component of the mobile phone toward the object to be photographed.

7. The camera attachment of claim 1, wherein the support comprises a rail, and the carrier member is mounted to the rail and is linearly movable relative to the support.

8. The camera attachment of claim 7, wherein the light component comprises an optical splitter, the optical splitter being optically coupled to at least two optical paths comprising respective optical emitters for projecting light from the illumination component of the mobile phone toward the object to be photographed.

9. The camera attachment of claim 7, wherein one of the carrier member and the rail defines a ridge and another of the carrier member and the rail defines a recess structure.

10. The camera attachment of claim 6, wherein the support further comprises flexible extensions adapted to grip sides of a cover of the mobile phone.

11. The camera attachment of claim 6, further comprising a cover for the mobile phone, wherein the support is monolithically formed with the cover.

12. The camera attachment of claim 1, wherein the light component comprises a light diffuser, the light diffuser comprising ridges for diffusing light.

13. The camera attachment of claim 6, wherein the support comprises a holding member to movably mount the carrier member to the support.

14. The camera attachment of claim 6, wherein the support comprises a snap-fit structure to movably mount the carrier member to the support.

15. The camera attachment of claim 6, wherein the light component comprises an optical fiber.

16. The camera attachment of claim 15, wherein the optical fiber comprises at least one of glass, plastic, or a combination thereof.

* * * * *